(12) United States Patent
Ofer (10) Patent No.: US 6,609,178 B1
(45) Date of Patent: Aug. 19, 2003

(54) SELECTIVE VALIDATION FOR QUEUED MULTIMODAL LOCKING SERVICES

(75) Inventor: Adi Ofer, Wellesley, MA (US)

(73) Assignee: EMC Corporation, Hopkinton, MA (US)

( * ) Notice: Subject to any disclaimer, the term of this patent is extended or adjusted under 35 U.S.C. 154(b) by 245 days.

(21) Appl. No.: 09/723,606

(22) Filed: Nov. 28, 2000

(51) Int. Cl.[7] .............................................. G06F 12/14
(52) U.S. Cl. ........................ 711/152; 711/163; 710/200
(58) Field of Search ................................ 710/200, 108; 711/151, 152, 163, 147

(56) References Cited

U.S. PATENT DOCUMENTS

| | | | |
|---|---|---|---|
| 5,206,939 A | | 4/1993 | Yanai et al. |
| 5,381,539 A | | 1/1995 | Yanai et al. |
| 5,592,432 A | | 1/1997 | Vishlitzky et al. |
| 5,615,373 A | * | 3/1997 | Ho ............................. 710/200 |
| 5,664,144 A | | 9/1997 | Yanai et al. |
| 5,729,749 A | * | 3/1998 | Ito ............................. 710/200 |
| 5,787,473 A | | 7/1998 | Vishlitzky et al. |
| 6,041,384 A | * | 3/2000 | Waddington et al. ....... 710/200 |
| 6,101,584 A | * | 8/2000 | Satou et al. ................. 711/152 |
| 6,304,938 B1 | * | 10/2001 | Srivastava .................. 710/200 |

OTHER PUBLICATIONS

Michael J. Fisher, Nancy A. Lynch, James E. Burns, Allan Borodin, "Resource Allocation with Immunity to Limited Process Fialure", 20th Annual Symposium on Foundations of Computer Science, San Juan, Puerto Rico, Oct. 1979, pp. 234–254.

Michael J. Fischer, Nancy A. Lynch, James E. Burns, Allan Borodin, "Distributed FIFO Allocation of Identical Resources Using Small Shared Space", ACM Transactions on Programming Languages and Systems, Jan. 1989 11(1): 90–114.

* cited by examiner

Primary Examiner—Gary J Portka
(74) Attorney, Agent, or Firm—John M. Gunther; Penelope S. Wilson (57) ABSTRACT

A queued, multimodal, self-validating lock mechanism selectively associates supplemental validation procedures with certain lock modes. Only those lock modes which heavily drain system resources are extensively validated.

2 Claims, 8 Drawing Sheets

| HOLDER_ID 31 | LOCK_MODE 33 | LOCK_PW 35 | CURRENT_HOLDER 37 | NEXT_FREE 39 |

MAIN 30

FIG. 3

| MY_ID 41 | LOCK_MODE_AUX 43 | MY_NUMBER_AUX 45 | TIME_STAMP_AUX 47 |

AUX 40

SELECTIVE VALIDATION FOR QUEUED MULTIMODAL LOCKING SERVICES

FIELD OF THE INVENTION

This invention relates generally to a method and apparatus for improving performance in systems where multiple processors contend for control of a shared resource through a lock associated with the shared resource, and more particularly to a method and apparatus for improving performance in intelligent data storage systems.

BACKGROUND OF THE INVENTION

When a computer system resource is shared by multiple processes running on multiple processors, or even on one processor, often there must be some way of insuring that no more than one such process may access that resource at any one time. In designing complex data storage systems including multiple processors, synchronizing access to shared resources has been recognized as an issue which must be addressed in order to maintain the consistency and validity of the data. However, the sharing issue may arise in connection with almost any resource that might be used by multiple requesters.

Many high-performance storage systems are intelligent data storage systems which may be accessible by multiple host computers. These may include, in addition to one or more storage device arrays, a number of intelligent controllers for controlling the various aspects of the data transfers associated with the storage system. In such systems, host controllers may provide the interface between the host computers and the storage system, and device controllers may be used to manage the transfer of data to and from an associated array of storage devices (e.g. disk drives). Often, the arrays may be accessed by multiple hosts and controllers. In addition, advanced storage systems, such as the SYM-METRIX® storage systems manufactured by EMC Corporation, generally include a global memory which typically shared by the controllers in the system. The memory may be used as a staging area (or cache) for the data transfers between the storage devices and the host computers and may provide a communications path which buffers data transfer between the various controllers. Various communication channels, such as busses, backplanes or networks, link the controllers to one another and the global memory, the host controllers to the host computers, and the disk controllers to the storage devices. Such systems are described, for example, in Yanai et al, U.S. Pat. No. 5,206,939 issued Apr. 27, 1993, (hereinafter "the '959 patent"), Yanai et al, U.S. Pat. No. 5,381,539 issued Jan. 10, 1995, (hereinafter "the '539 patent"), Vishlitzky et al, U.S. Pat. No. 5,592,492 issued Jan. 7, 1997, (hereinafter "the '492 patent"), Yanai et al, U.S. Pat. No. 5,664,144 issued Sep. 2, 1997 (hereinafter "the '144 patent), and Vishlitzky et al, U.S. Pat. No. 5,787,473 issued Jul. 28, 1998, (hereinafter "the '473 patent"), all of which are herein incorporated in their entirety by reference. The systems described therein allow the controllers to act independently to perform different processing tasks and provide for distributed management of the global memory resources by the controllers. This high degree of parallelism permits improved efficiency in processing I/O tasks. Since each of the controllers may act independently, there may be contention for certain of the shared memory resources within the system. In these systems, the consistency of the data contained in some portions of global memory may be maintained by requiring each controller to lock those data structures which require consistency while it is performing any operations on them which are supposed to be atomic.

Since locking inherently reduces the parallelism of the system and puts a high load on system resources, locking procedures must be designed with care to preserve system efficiency. Adding features to the lock, such as queuing, lock override procedures, or multimodality can help to avoid some pitfalls of common lock protocols, such as processor starvation, deadlocks, livelocks and convoys. However, it is also known that, while many of these lock features have individual advantages, multifeatured lock management procedures are difficult to design and implement without unduly burdening system resources or inadvertently introducing pitfalls such as additional deadlock or starvation situations. For example, multimodal locks, which permit the requestor to identify the kind of resource access desired by the requester and the degree of resource sharing which its transaction can tolerate, can be useful in improving system performance and avoiding deadlocks, but providing a lock override which is suitable for a multimodal lock is quite difficult. If, for example, one lock mode is set to allow unusually long transactions, a timeout set to accommodate normal transactions will cut the long ones off in midstream while a timeout set to accommodate the long transactions will allow failures occurring during normal transactions to go undetected for excessively long periods. Moreover, timeouts are competitive procedures which, in certain circumstances, undesirably offset the cooperative advantages of a queued lock. Because of the complexities introduced by multifeatured locks, it is desirable to validate features and modes which create particularly significant drains on system resources, such as long timeout modes, but introducing additional validation features can itself load system resources to the point where the system efficiency suffers.

Providing suitable procedures becomes especially difficult in complex multiprocessor systems which may contain a number of queued locks associated with different shared resources and where a requestor may have to progress through a number of lock request queues in turn in order to complete a process. In these systems, it is desirable that whatever procedure is implemented be fair, ensure that each requestor eventually obtains access to the lock whether or not all other requesters in the system are operating properly, and minimize the average waiting time for each requestor in the queue to improve system efficiency. Queued locks which implement a first-in-first-out (FIFO) protocol meet the fairness criteria because denied requests are queued in the order they are received. One such lock services procedure, often known as the "bakery" or "deli" algorithm, is described, for example, in "Resource Allocation with Immunity to Limited Process Failure", Michael J. Fischer, Nancy A. Lynch, James E. Burns, and Alan Borodin, $20^{th}$ Annual Symposium on Foundations of Computer Science, San Juan, Puerto Rico, October 1979, p 234–254; and "Distributed FIFO Allocation of Identical Resources Using Small Shared Space", ACM Transactions on Programming Languages and Systems, January 1989, 11(1): 90–114. When all requestors in the system are operating properly, the basic "deli" algorithm also meets the other criteria, but a protocol violation such as the failure of any processor in the lock request queue can lead to total system deadlock. However, in all complex multiprocessor systems, occasional protocol violations are inevitable, and the "deli" algorithm makes no provision either for detecting these through validation procedures or otherwise, or for handling them when they occur. Moreover, the basic "deli" lock is a unimodal lock.

A lock is needed which supports multiple locking modes and makes provision both for validation features to detect protocol violations and lock override procedures to manage the violations without unduly reducing system efficiency, and which also meets desirable design criteria for fairness, wait time minimization and guaranteed access.

SUMMARY OF THE INVENTION

In accordance with the present invention, a lock mechanism for managing shared resources in a data processing system is provided.

In accordance with the present invention, a method for providing queued, multimodal, self-validating locking and unlocking services for managing a shared resource in a data processing system is provided. The lock mechanism is multimodal and self-validating. One or more supplemental validation procedures may be selectively associated with certain lock modes. Thus, lock modes which constitute a particularly heavy drain on system resources may be extensively validated after the lock is reserved but before the requestor commits to locking the shared resource in these modes to avoid committing the system in error, while the drain on system resources which would be created by validating every lock transaction to a comparably high level may be avoided.

In one aspect of the invention, a method for providing queued, multimodal, self-validating locking and unlocking services for managing a shared resource in a data processing system is provided. The system includes a plurality of processors as lock requestors. Each processor supports atomic operations and is coupled to the shared resource through one or more first common communication channels. The method includes providing for the shared resource, an associated main lock data structure stored in a shared memory accessible by the processors. The main lock data structure includes in a single atomic structure, the resources needed to lock the shared resource by a successful lock requester, to identify one of at least two lock modes, to establish a queue of unsuccessful lock requesters, and to validate the existence of the lock. The method also includes providing for each processor a lock services procedure including at least fist and second lock mode procedures, a lock mode selection procedure for selecting one from the lock mode procedures by a successful lock requester, a queuing procedure for unsuccessful lock requesters, locking and unlocking procedures for locking and unlocking the shared resource in the selected lock mode by a successful lock requestor, and a supplemental validation procedure selectively associated with the second lock mode for validating the lock by a successful lock requestor. The method also includes the step of selecting one from the lock modes by a requesting processor. The method also includes the step of, in a single atomic operation by the requesting processor, examining the contents of the main lock data structure to determine if another requesting processor has previously locked the shared resource and if the lock contents are valid, and writing data to the main lock data structure to establish its place in a queue of requesters for subsequent locks on the shared resource if some other requesting processor has previously locked the shared resource and the lock contents are also valid, or writing data to the main lock data structure to reserve and validate the lock and to identify the first lock mode if the lock contents are invalid or if no other requesting processor has previously locked the shared resource. Then, if the lock contents are invalid or if no other requesting processor has previously locked the shared resource and the second lock mode has been selected by the requesting processor, the requesting processor executes the supplemental validation procedure by the requesting processor to validate the lock allocation to that requesting processor. If the supplemental validation procedure does validate the lock allocation to that requesting processor, then the requesting processor writes data to the main lock data structure to identify the second lock mode, but if it does not, the requesting processor does not enter the second lock mode.

In another aspect of the invention, a more efficient intelligent storage system is provided. The intelligent storage system typically includes multiple processors as requestors, and these are coupled to a shared resource through one or more first common communication channels. Each processor supports atomic operations. A lock services procedure is implemented in each of the processors. The lock services procedure includes at least first and second lock mode procedures, a lock mode selection procedure for selecting one from the lock mode procedures by a successful lock requestor, a queuing procedure for unsuccessful lock requestors, locking and unlocking procedures for locking and unlocking the shared resource in the selected lock mode by a successful lock requestor, and also includes at least one supplemental validation procedure selectively associated with the second lock mode for validating the lock by a successful lock requestor. A main lock data structure, responsive to these lock services procedures and associated with the shared resource, is implemented in the shared memory accessible over one or more second common communications channels to all of the processors. The main lock data structure provides, in a single atomic structure, the resources needed to lock a shared resource, identify one of the at least two lock modes, establish a queue of unsuccessful lock requesters, and validate the existence of the lock, Resources are also provided to validate the identity of the successful lock requestor in connection with certain transactions. The lock services procedure also enables each processor, in a single transaction, to request locks on the shared resource, to validate the existence of a lock in the main lock data structure, to request locks on the shared resource, to lock the shared resource if its request is successful and to establish a place in a queue of requestors for subsequent locks on the shared resource if its request is unsuccessful. Each requesting processor is operable in accordance with its lock services procedure to select one from the lock modes. Each requesting processor is also operable in accordance with its lock services procedure in a single atomic operation, to examine the contents of the main lock data structure to determine if another requesting processor has previously locked the shared resource and if the lock contents are valid, and to write data to the main lock data structure to establish its place in a queue of requesters for subsequent locks on the shared resource if some other requesting processor has previously locked the shared resource and the lock contents are also valid, or to write data to the main lock data structure to reserve and validate the lock and to identify the first lock mode if the lock contents are invalid or if no other requesting processor has previously locked the shared resource. Then, if the lock contents are invalid or no other requesting processor has previously locked the shared resource and the second lock mode has been selected by the requesting processor, the requesting processor is operable to execute the supplemental validation procedure in order to validate the lock allocation to that requesting processor. If the supplemental validation procedure does validate the lock allocation to that requesting processor, then, the requesting processor is operable to write data to the main lock data structure to identify the second lock mode, but if it does not, the requesting processor does not enter the second lock mode. Thus, data may be written to lock the shared resource in a first one of at least two lock modes as a part of this atomic operation or to lock the shared resource in a second one of at least two lock modes in a subsequent atomic operation following a supplemental validation procedure.

In yet another aspect of the invention, multiple processes running on a single processor may in some aspects act as requesters and a lock allocation process or procedure may be invoked by each of these processes, but the operation of the invention is otherwise as described above.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
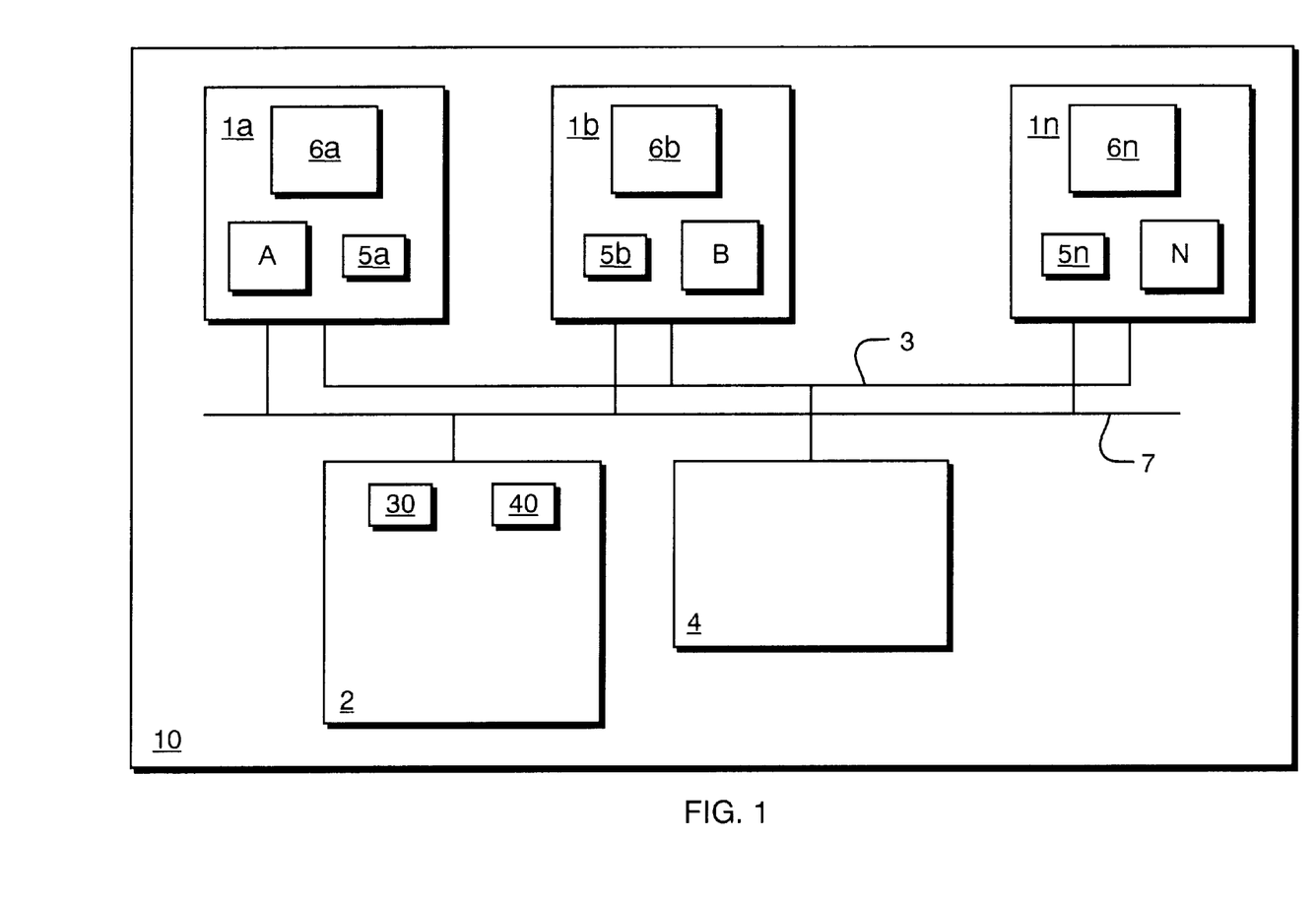
FIG. 1 is a block diagram of a computer system including a shared resource and incorporating the present invention.

Referring now to FIG. 1, computer system 10 is shown to include, among other things, a plurality of processors 1a–1n, running processes A–N, coupled to a shared resource 4 via one or more first common communication channels 3a–n and to a shared memory 2 via one or more second common communication channels 7a–n. For purposes of illustration, only one first common communication channel 3 and one second common communication channel 7 are shown in FIG. 1. Any or all of processors 1a–1n may request access to shared resource 4 in order to execute their processes A–N. The processors are actual or virtual digital processing units which include one or more CPU's and additional local memory 5a–n. For example, processor 1a may be an intelligent device controller, an open-systems computer, a personal computer, a server, an intelligent host controller or a virtual system residing on a mainframe computer. Since each of the computer systems just mentioned typically communicates using a specific communication protocol, each of the first and second common communication channels will correspondingly be those channels specific to the computer system to which they are coupled. That is for example, assuming processor 1b is an open-systems type server (e.g. running the UNIX Operating System), channel 3 or 7 would typically be a SCSI type communications bus or a fibber-channel communications path. All communications over channel 3 or 7 would therefore adhere to the respective SCSI or fibre-channel communications protocols. Processes A–N may be, for example, procedures run by the processors, operating system processes or higher level applications. The processors may run other processes not involving shared resource 4. The invention may also be applicable to multiple processes contending for a shared resource but running on a single processor, although this aspect is not illustrated in the drawings. To synchronize accesses to the shared resource 4 and provide data consistency, system 10 also provides a queued lock associated with shared resource 4. The queued lock is implemented by a main lock data structure, 30 and, in some aspects, an auxiliary lock data structure, 40, both further described below, in shared memory 2 and a lock services procedure 6a–6n running on each of processors 1a–1n, respectively. The lock data structures, 30 and 40, must be implemented in a section of memory that is accessible by all of the processors which might need access to the shared resource, although they need not be on the same media as the shared resource. The procedures which allocate the lock may be centralized or distributed. In the intelligent data processing systems described above, the lock services procedures are typically distributed among the various intelligent controllers.

The main lock data structure, 30, is used for queuing, mode designation, and transfers of control. It is an atomic data structure which indicates the queue position of the current holder of the lock, the next available position in the queue of subsequent lock requests, the lock mode employed by the current successful lock requestor, and validation information which may be used to identify certain protocol failures requiring lock overrides. Resources may also be provided in the main lock data structure to validate the identity of the successful lock requestor in connection with certain transactions. In some aspects of the invention, the auxiliary lock data structure, 40, is used for validation and may be used to identify additional protocol failures requiring lock overrides, for example, those associated with a particular lock mode. The auxiliary lock data structure, 40, may be a single entry, the entry being a single atomic structure, or it may be an array which includes an entry for each processor, each entry being a single atomic structure. Each entry includes the resources needed to identify the successful lock requestor's place in a queue of requesters and to identify the successful lock requestor. Each processor typically invokes its lock services procedure, for example procedure 6b for processor 1b, before starting a transaction on the shared resource 4, and may obtain a lock on the shared resource 4 if it is available. Only after a successful requestor from among the processors obtains the lock will that processor perform its transaction on shared resource 4. If the shared resource 4 is already locked at the time the request is received, or if there are multiple simultaneous requests for access, the lock services procedure will queue the unsuccessful requests on a lock request queue 50. In relevant part, each of the lock services procedures 6a–6n incorporates, in accordance with the present invention, a lock contention procedure, at least two lock mode procedures, procedures for locking, mode designation and unlocking operations by a successful lock requestor in normal operation, algorithms for arbitrating among multiple requests for locks on the shared resource 4 from multiple unsuccessful requestors 1a–1n, and a polling procedure for allowing a previously unsuccessful requestor to determine its current status, and, in some aspects, lock override procedures and supplemental lock validation procedures associated with various lock modes, all of which will be further described below.

The shared resource 4 of computer system 10 may be almost any resource that might be used by multiple processes, such as a mass storage device, a memory, a data structure within a memory, an ATM or a communication device. The shared memory 2 of computer system 10 is mutually shared by or accessible to the processors 1a–n. The shared memory 2 and shared resource 4 may be contained in a single logical object, in separate logical objects contained in a single physical object, such as two portions of a global memory, or they may be separate physical and logical objects, such as a memory and a disk drive. In one aspect, described in more detail below, the invention is implemented in an intelligent data storage system which includes several individual components coupled via internal communications channels, and the shared resource 4 is one or more of a set of shared data resources, such as data records, data management records and blocks of data, in the data storage system.

Figure 2:
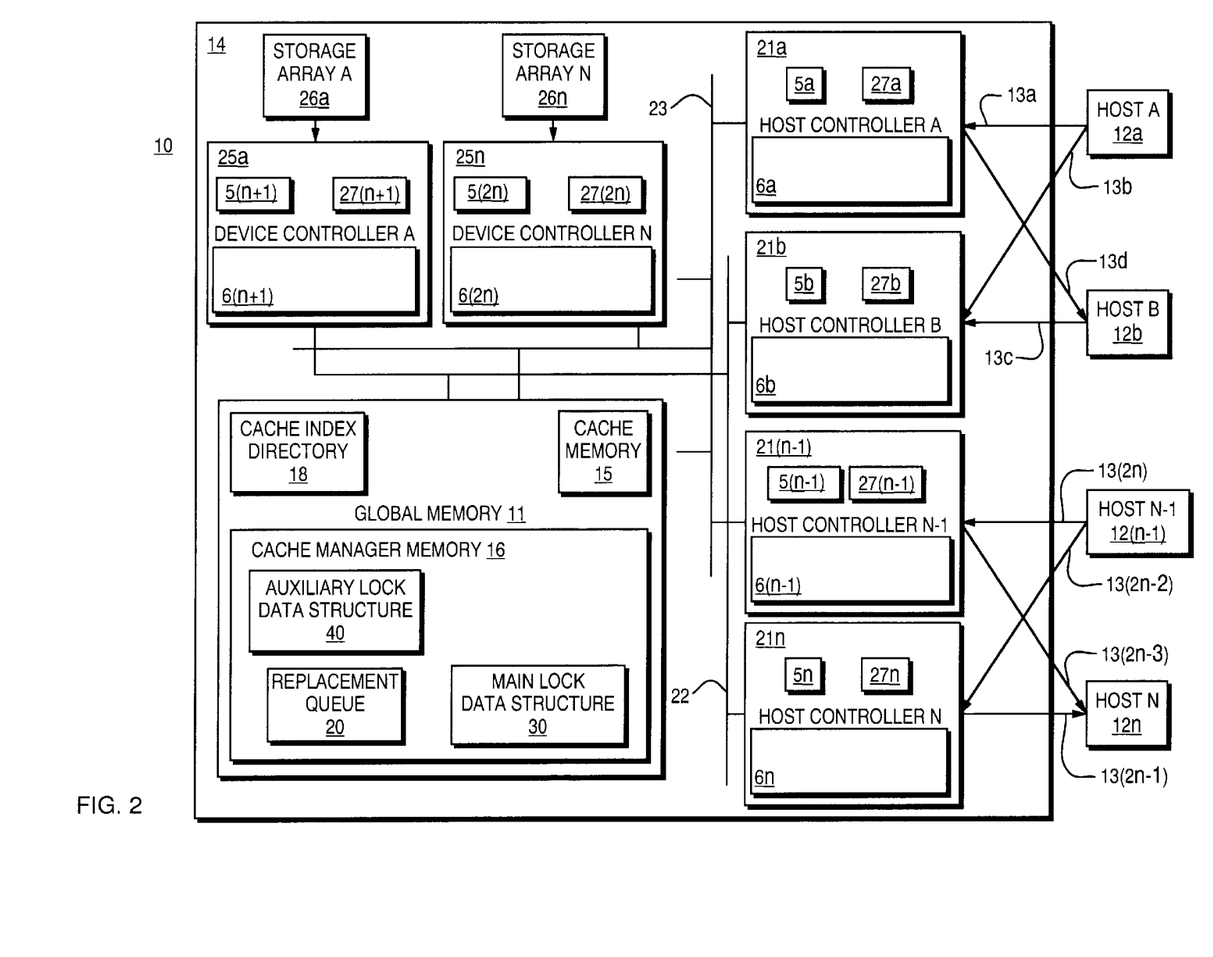
FIG. 2 is a more detailed block diagram of the computer system of FIG. 1 including an intelligent mass storage system.

Referring now to FIG. 2 the computer system 10 of FIG. 1 is shown in more detail. Computer system 10 includes an intelligent data storage system 14, and may also include a plurality of host processors 12a–12n connected to the intelligent data storage system 14 by host communication channels 13a–13(2n). The storage system 14 includes a plurality of host controllers 21a–21n which are, according to a preferred embodiment of the present invention, coupled alternately to buses 22 and 23. Each host controller 21a–21n is responsible for managing the communication between its associated attached host computers and storage system 14. Storage system 14 also includes a global memory 11 coupled to both buses 22 and 23. Preferably, the global memory is a high speed random access semiconductor memory. Global memory 11 includes a large cache memory 15 which is used during the transfer of data between the host computers and the storage devices of arrays 26a–26n. The global memory 11 also includes, as further described below, a cache manager memory 16 and a cache index directory 18 which provides an indication of the data which in stored in the cache memory 15 and provides the addresses of the data which is stored in the cache memory. Also coupled alternately to buses 22 and 23 are a plurality of device controllers 25a–25n. Coupled to each device controller is an array of mass storage devices 26a–26n which as shown here may be magnetic disk devices. As with the host controllers described above, each device controller is responsible for managing the communications between its associated array of drives and the host controllers 21a–21n or global memory 11 of storage system 14.

A set of shared data resources in which data may be stored are implemented in data storage system 14 and accessible by a plurality of the processors in system 10. Some or all of the data records, blocks of data and data management records in the global memory 11 and device arrays 26a–26n may be shared data resources. By way of example and in order illustrate certain aspects of the invention, the invention will be explained by treating a single data structure implemented in a portion of global memory 11 as the only shared resource 4. The exemplary data structure is a replacement queue 20, formed from a region of shared memory, such as cache manager memory 16. Replacement queue 20 is analogous to the "least recently used" (LRU) queue used in prior art cache managers for readily identifying the least-recently-used data element in the cache. Because the cache memory has a capacity that is smaller than the main memory, it is sometimes necessary for data elements in the cache memory to be removed from or replaced in the cache memory in order to provide space for new data elements being staged into the cache memory. Typically, the cache manager will remove or replace the "least-recently-used" data element in replacement queue 20. Various techniques have been described for dynamically monitoring and adjusting cache parameters, as described, for example, in the '473 patent and the '959 patent, supra. The performance of system 14 is highly dependent on the cache management strategy selected. The strategy is implemented by procedures 27a–27n. Since some of these strategies allow the cache slot at the head of replacement queue 20 to contain something other than the "least-recently-used" data element, replacement queue 20 is referred to more generally as the replacement queue.

It will be understood, however, that the typical intelligent data storage system 14 includes many such shared data resources. The invention is equally applicable to any shared resource 4 in a system 10 which may be accessed by a plurality of the processors through a queued lock. By way of example and not by way of limitation, other shared resources in intelligent data storage system 14 may include cache index directory 18, other data structures in cache manager memory 16, some or all of the data records in cache memory 10, and some or all of the blocks of data on disk arrays 26a–26n. Intelligent data storage systems for certain applications, such as those supporting airline reservation systems, may require extensive locking of shared data resources, while other applications may require locking of fewer data resources.

Figure 3:
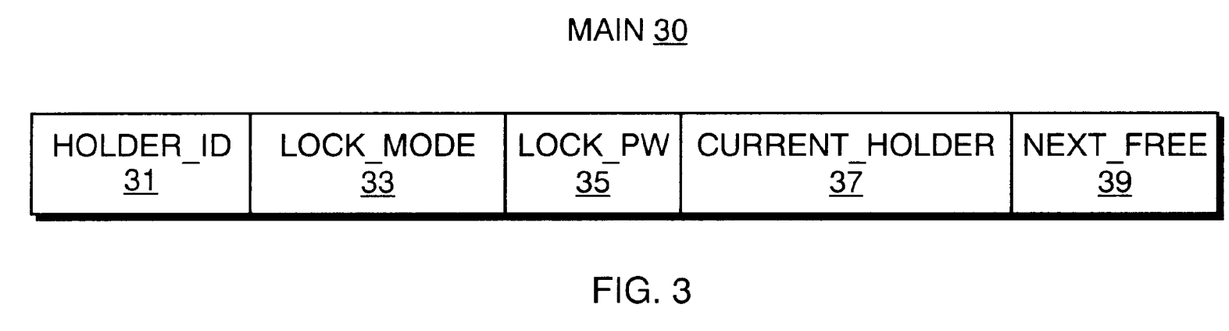
FIG. 3 is a schematic diagram of the main lock data structure used to implement the invention in the system described herein.
Figure 4:
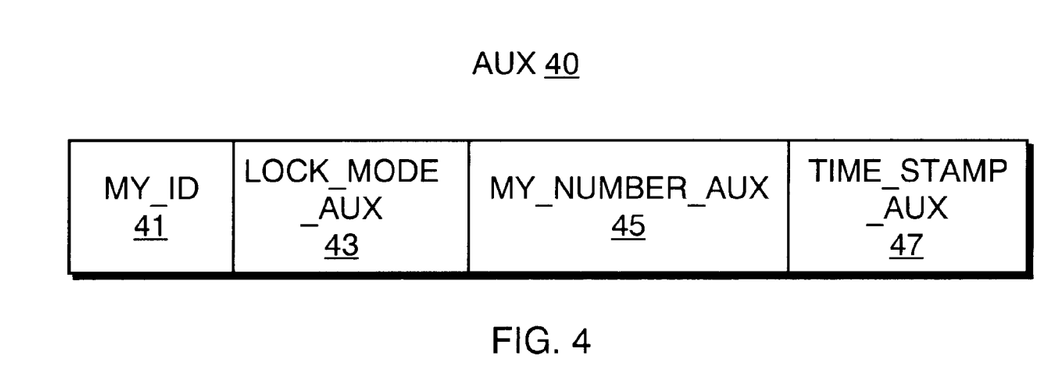
FIG. 4 is a schematic diagram of the auxiliary lock data structure used to implement the invention in some aspects of the system described herein.

In the exemplary embodiment, the main lock data structure 30 and the auxiliary lock data structure 40, further described in connection with FIG. 3 and FIG. 4, are also implemented in cache manager memory. Various procedures may be executed by each of the host controllers 21a–21n and device controllers 25a–25n to access and manage the replacement queue 20 as well as other shared data resources in cache memory 15, cache index directory 18 and cache manager memory 16, as further described, for example, in the '539 patent, the '307 patent, the '144 patent, and the '473 patent, all of which are herein incorporated in their entirety by reference. Procedures 6a–6(2n) are the lock services procedures of this invention. Procedures 27a–27(2n) are the replacement queue management procedures for host controllers 21a–2n and device controllers 25a–25n respectively. Thus, in the illustrative embodiment, the shared resource 4 is replacement queue 20 implemented in the cache manager memory 16 of global memory 11, the processors 1a–n are the host controllers 21a–21n and device controllers 25a–25n, processes A–N are the replacement queue management procedures 27a–27(2n) which manage the replacement queue 20, and the shared memory 2 is also the cache manager memory 16. The storage busses 22 and 23 provide access to the shared resource 4, so these are the first communication channels 3a–3n. The storage busses 22 and 23 also provide access to the shared memory 2 so these are the second communication channels 7a–7n. Local memory 5a–5n will typically be implemented on both host controllers 21a–21n and device controllers 25a–25n.

It should be noted that this example illustrates two preferred aspects of the invention, namely, that the system embodying the invention is the intelligent data storage system 14 and that the processors access the lock data structures 30 and 40 over the same channels used to access the shared resource 4, i.e. the first and second communication channels are identical. However, within the scope of the invention, the processors may be any or all of the host controllers 21a–21n, device controllers 25a–25n, or host computers 12a–12n, the channels 3a–3n may be any or all of channels 13a–13n or busses 22 or 23, and the processes A–N and associated lock services procedures 6a–6n may be other processes or procedures managing other shared data resources. Moreover, the lock data structures 30 and 40 need not reside in the same logical device or be accessed over the same channels as each other or as the shared resource 4. The invention is also applicable to embodiments where the first and second communication channels are separate.

Before proceeding further, it may be helpful to describe the data structures used in one embodiment of the invention. FIG. 3 is a schematic diagram of a preferred form of the main lock data structure 30, and FIG. 4 is a schematic diagram of a preferred form of the auxiliary lock data structure, 40.

MAIN, the main lock data structure, 30, is short enough for an atomic operation and typically has the following form:

HOLDER_ID, LOCK_MODE, LOCK_PW, CURRENT_HOLDER, NEXT_FREE.

The HOLDER_ID parameter, 31, may be used as an identifier of the requestor which currently holds the lock. Each possible requestor in the system is assigned a unique HOLDER_ID. In some aspects of the invention, it is only updated in connection with certain lock modes, so it may not always identify the current holder of the lock. It is an optional parameter, since it is used primarily to validate the identity of a successful lock requestor The LOCK_MODE parameter, 33, specifies the type of lock which is currently being used by the current lock holder. In addition to the basic lock mode procedure associated with a particular LOCK_MODE parameter, one or more supplemental validation procedures, lock override procedures, or both may be selectively associated with each LOCK_MODE parameter. For example, some processor operations take much longer than others, and in systems which implement a preset timeout to override the lock in the event of a protocol failure, it may be desirable to establish a lock mode for these longer operations in which the normal timeout will not occur. Thus, a first lock mode may be associated with a normal timeout lock override procedure and a second lock mode with a different timeout procedure, or none at all. Additional lock modes may be associated, for example, with shared access to certain data. In one aspect of the invention, one of lock modes (and any lock mode, supplemental validation or override procedures associated with this lock mode) will be the default lock mode. In order to illustrate the invention, and not to limit it, a dual-mode locking system will be described, and the only differences between the two lock modes will be the supplemental validation and lock override procedures associated with them. In the illustrative embodiment, the first lock mode is associated with a competitive, normal timeout lock override procedure and has no supplemental validation procedure, while the second lock mode does have an associated supplemental validation procedure and is also associated with two lock override procedures, one a competitive, long timeout procedure and the other a cooperative, event-based lock override procedure. However, if one byte is allocated to the LOCK_MODE parameter, up to two hundred fifty-six lock modes, with their associated lock mode, supplemental validation and lock override procedures, may be supported within the atomic data structure for MAIN. In the illustrative embodiment the LOCK_MODE value for a normal timeout mode is the default setting "0" for the LOCK_MODE parameter, while "T" is the LOCK_MODE value for long timeout.

The LOCK_PW parameter, 35, indicates whether a valid lock is held. It has a valid value for the "no lock holder" state, and one or more valid values indicatin that the lock is held. All other values are invalid. In one aspect of the invention, each shared resource, 4, is assigned its own value of LOCK_PW, 35. This parameter may be used to identify certain protocol failures requiring lock overrides.

The CURRENT_HOLDER parameter, 37, indicates which place in the lock request queue presently holds the lock. It indicates a place in line, not an identification, but, as will be explained below, it enables the requestor which holds that place in line to determine when it may take the lock.

The NEXT_FREE parameter, 39, indicates the next available place in the lock queue. Both CURRENT_HOLDER and NEXT_FREE are numeric parameters whose values wrap so that the allowable size of the parameter is never exceeded.

AUX, the auxiliary lock data structure, may be a single entry, the entry being a single atomic structure, or it may be an array which includes an entry for each processor, each entry being a single atomic structure. In the embodiment shown, AUX, 40, is a single entry, short enough for an atomic operation, and typically has the following form:

MY_ID (optional), LOCK_MODE_AUX, MY_NUMBER_AUX, TIME_STAMP_AUX (optional)

Since the auxiliary lock data structure, 40, is used primarily to assist in determining when a protocol failure requiring certain lock override procedures has occurred, it is typically not updated every time a new requestor takes the lock. This feature of the invention will be further described in connection with FIG. 7.

The MY_ID parameter, 41, is an identifier uniquely associated with each processor. As will be further discussed below, the entry is typically refreshed only when that processor is the requestor which currently holds the lock, and only in connection with certain lock modes. In the array form of AUX, only one value of MY_ID(i) is valid for any given entry, since each entry is associated with and can be written by only one processor, but in the illustrated form, N different values of MY-ID are valid, one being associated with each of the N possible requesters. This parameter is optional, but may be used for validation in certain protocol failure situations, as further explained below.

The LOCK_MODE_AUX parameter, 43, specifies the type of lock which is currently being used by the current lock holder. It has the same possible values and serves the same purpose as the LOCK_MODE parameter, 53.

The MY_NUMBER_AUX parameter, 45, indicates what place in the queue the processor holds. The entry is typically refreshed only in connection with certain lock modes when a requester which holds the lock in that mode. In the array form of AUX, each processor may refresh only the value in its own entry in the array.

The TIME_STAMP_AUX parameter, 47, indicates the time at which the processor making the entry obtained the lock. It is typically used to start a timeout clock. This parameter is optional, but may be used for certain types of lock overrides, as will be further explained below.

In addition to MAIN, 30, and AUX, 40, which must be stored in shared memory, 2, so that all possible requestors may access them, two additional numerical variables, MY_NUMBER, 51a–n, and TIME_STAMP_L, 53a–n, are associated with each potential requestor. While these may be stored in any system resource to which the requestor has access, typically, both MY_NUMBER, 51i, and TIME_STAMP_L, 53i, are stored in the local memory associated with each potential requester in order to reduce bus traffic. Each requestor also requires sufficient local memory to store the two most recent values of MAIN and the value of an AUX entry.

Figure 5:
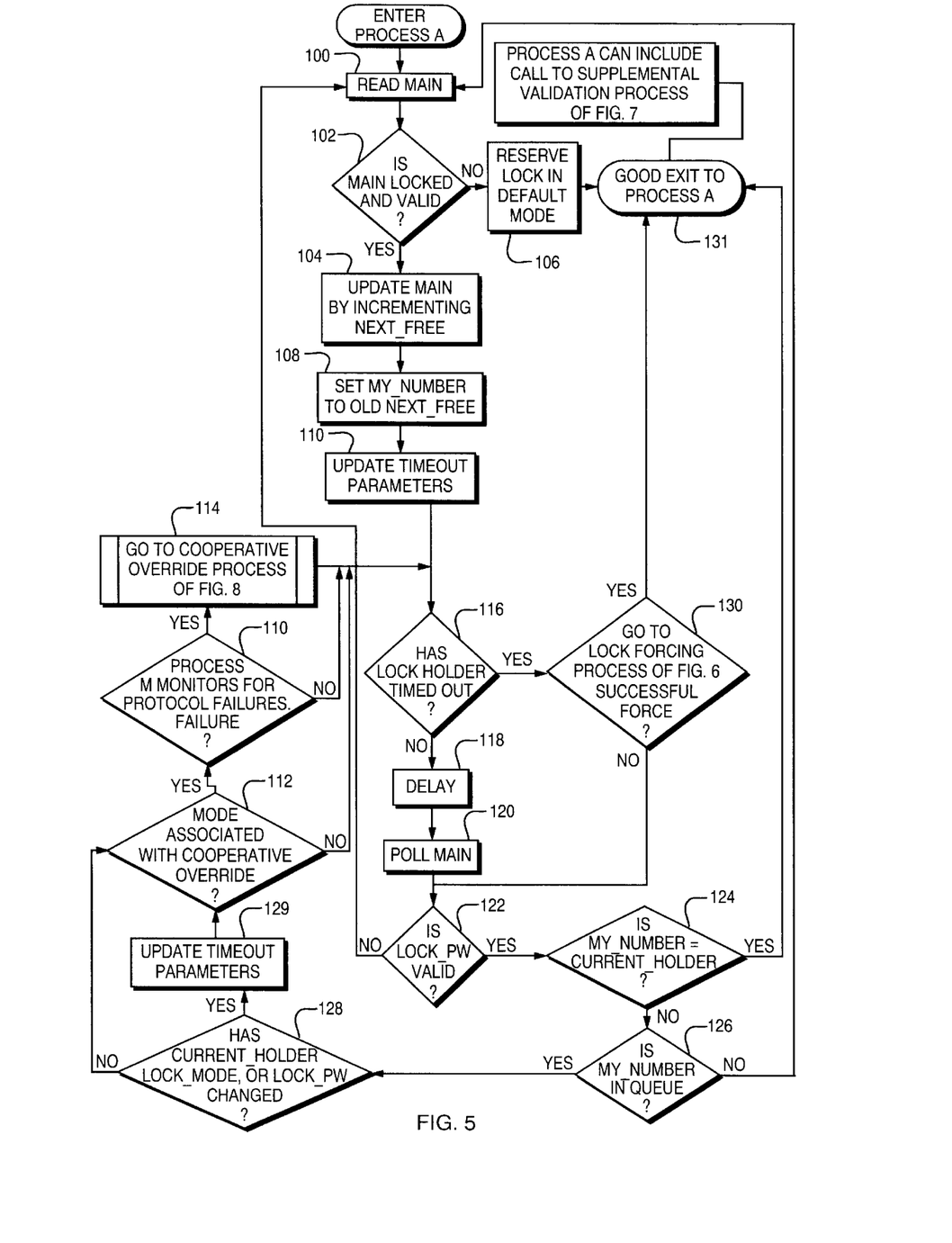
FIG. 5 is a flowchart illustrating steps used to enter the lock request queue, and to poll for and obtain the lock during normal operation of the system described herein.

Turning now to FIG. 5, the steps used to enter the lock request queue, and to poll for and obtain the lock during normal operation of the system described herein are illustrated in a flowchart. Prior to entering the process described in FIG. 5, processor 1a has, in the course of executing process A, identified a need to obtain a lock on a shared resource 4, illustratively, the replacement queue, 20. In a single atomic read-modify-write operation, represented on the flowchart by steps 100, 102, 104, and 106, processor 1a initiates its attempt to obtain the lock. In step 100, processor 1a reads MAIN, and in step 102, determines whether the lock is validly held. If the lock is currently held by another requester, the LOCK_PW, 35, will have a valid value indicating that the lock is held.

If this condition is not true, processor 1a will reserve the lock in default mode and establish a lock request queue at step 106 by setting HOLDER_ID, 31, to its own value, LOCK_MODE, 33 to "0", LOCK_PW, 35, to a valid value, CURRENT_HOLDER, 37, to the value presently entered in NEXT_FREE, 39, and by incrementing NEXT_FREE, 39. Next, at step 131, processor 1a makes a good exit to process A. Processor 1a may call the supplemental validation process described in connection with FIG. 7, either immediately upon completing step 106, if it requires the lock in a mode other than the default mode, or at some later point in its execution of process A, if, for example, an error or branch condition creates the need for an alternate activity, likerecovering the structure of the shared resource, which would require the alternate lock mode.

Assuming that the lock is validly held by another processor, processor 1a queues for the lock in a single atomic read-modify-write operation represented in FIG. 5 by steps 100, 102 and 104. If upon reading MAIN in step 100, processor 1a determines that the lock is validly held by another requestor by the method previously described in connection with step 102, then, at step 104, processor 1a will reserve the next available number in the queue by incrementing the value of NEXT_FREE in MAIN. At step 108, processor 1a enters the queue by setting the value of MY_NUMBER, 51a, to the value of NEXT_FREE it read in step 102.

The processor then updates the timeout parameters at step 110, assuming the lock mode it detected in step 100 by reading MAIN has a timeout-based lock override procedure associated with it in lock services procedure 6. If there is no timeout-based lock override procedure associated with the lock mode, then processor 1a may jump directly to the lock polling sequence beginning at step 118. In the exemplary embodiment shown in FIG. 5, there is a timeout-based lock override procedure associated with each of the two possible lock modes, so at step 110, processor 1a updates in its local memory the override parameters associated with the lock mode it has found to be in effect. Each lock mode which has an associated timeout procedure may use a different source for its reference value and a different predetermined interval associated with it in lock services procedure 6. Thus, for example, the normal timeout mode may use obtain its reference value from its own clock and have a timeout interval of a few seconds or less, while the long timeout mode may obtain its reference value from AUX, 40, and have a timeout interval of many minutes. So, in one aspect of the invention, processor 1a performs the update by saving the time at which step 108 occurs (as measured by its own internal clock) in TIME_STAMP_L, 53, for use as a reference value in monitoring whether a timeout has occurred. In this approach, the timeout is established and monitored without involving scarce system resources such as the busses in any additional I/O cycles, so it is suitable for use as the lock override procedure corresponding to the default lock mode. In another aspect of the invention, processor 1a may perform this update by taking a timestamp value from TIME_STAMP_AUX, 47 for use as a reference value in monitoring whether a timeout has occurred. If AUX is an array, Processor 1a determines what entry in AUX to use for this purpose from the value of HOLDER_ID, 31, which processor 1a read in MAIN, 30, at step 100. For validation, processor 1a may confirm that its LOCK_MODE_AUX is set to the second lock mode, and, if MY_ID is implemented, may confirm that AUX also has a value of MY_ID corresponding to the value of HOLDER_ID. If, when processor 1a executes these validation steps, AUX is found not to be valid, processor 1a may default to a short, fixed, timeout value. If a valid AUX entry is found, processor 1a will save the time from TIME_STAMP_AUX to the processor's local memory, for example in TIME-STAMP_L for use in monitoring whether a timeout has occurred. In this aspect of the invention, several additional I/O cycles involving scarce system resources are required to validate the lock mode and establish the reference value for the timeout, so this approach is most suitable when either the timeout procedure itself or the lock mode procedure it is associated with (or both) are expected to consume many more I/O cycles or system resources than the default lock mode. In this situation, the small number of I/O cycles used may be justified by decreased likelihood that one or both of these procedures will be initiated in error.

Assuming that a timeout-based lock override has been determined to be associated with operative lock mode, in step 116, processor 1a will continue with the procedure by testing to see if a timeout has occurred by determining whether the predetermined interval has elapsed since the reference value for the timeout was updated. If a timeout is detected, at step 130, processor 1a enters the lock forcing process further described in connection with FIG. 6. If a timeout has not occurred, processor 1a begins polling MAIN. In one embodiment of the invention, at step 118, processor 1a estimates, before every repetition of polling step 120, the number of prior entries in the lock request queue and adaptively delays its polling period as a function of said number of prior entries in said lock request queue. The polling period may be estimated as the product of the number of significant processor operations expected to be performed before processor 1a obtains the lock as a function of the number of prior entries in said lock request queue and the average duration of a significant processor operation involving the shared resource. This delay procedure is further described in U.S. Ser. No. 09/312,146 filed May 14, 1999 by Ofer et al and entitled "Adaptive Delay of Polling Frequencies in a Distributed System with a Queued Lock", which is herein incorporated by reference in its entirety. After polling MAIN in step 120, processor 1a performs a sequence of sanity checks on the updated value of MAIN, 30, which it has obtained from the polling step, 120, and stored in its local memory. The sanity check sequence may also be entered from the lock forcing process of step 130 after a failed attempt to force the lock. If processor 1a determines at step 122 that the LOCK_PW, 35, is invalid, processor 1a will jump to step 100 and attempt to obtain the lock. If the LOCK_PW, 35, is valid and processor 1a finds at step 124 that it has obtained the lock, i.e. that the value of CURRENT_HOLDER, 37, read at step 120 equals MY_NUMBER, 51a, processor 1a will enter the good exit/supplemental validation process at step 131. If upon reading MAIN, 30, in step 120, processor 1a determines at step 122 that the LOCK_PW, 35, is valid and at step 124 that the lock is still held by another requester by the method previously described in connection with step 102, then, at step 126, processor 1a compares MY_NUMBER with CURRENT_HOLDER and NEXT_FREE to determine whether processor 1a is still in the queue. If, when adjusted for the queue wrap, MY_NUMBER is not between CURRENT_HOLDER and NEXT_FREE, this indicates that the lock has been reset due to a lock override, as will be described further in connection with FIG. 6, and processor 1a is not a member of the current queue of lock requesters. Processor 1a then goes to step 100 and repeats steps 100, 102, 104, and 108 in order to join the new lock queue. If step 126 confirms that processor 1a is still part of the current lock request queue, then, as will be further discussed in connection with the lock override procedures described below, at step 128 processor 1a will determine if CURRENT_HOLDER, 37, LOCK_MODE, 33, or LOCK_PW, 35 has changed. At step 129, processor 1a may update its timeout parameters if any of these has changed since its last reading of MAIN.

In one aspect of the invention, each processor implements a monitoring procedure, M, for detecting a predetermined indication of protocol failure by an one of the plurality of processors and identifying the failing processor. This procedure, M, is external to lock contention procedure, but may be used to trigger certain lock override procedures, for example, the cooperative lock override process described in connection with FIG. 8. In one aspect of the invention, shown in FIG. 5, processor 1a will determine at step 112 whether the lockholder is operating in a lock mode associated with an override which uses this trigger, such as the cooperative lock override, and if the lockholder is, process May be periodically polled by processor 1a Upon receiving an indication of protocol failure during this poll, processor 1a will initiate a lock override process at step 114, as further described in connection with FIG. 8. At the conclusion of the process shown at step 114, there will typically be a new lockholder, and processor 1a will go to step 116 to continue checking for timeouts. Alternatively, procedure M may cause a jump to a lock override process at step 114, as further described in connection with FIG. 8. The procedure M is shown for convenience operating at step 113 although it will be understood that it operates periodically so long as the processors are running. In a preferred embodiment, the polls do not occur when the lockholder is operating in the default lock mode, but only in connection with a more resource-intensive lock mode such as the long timeout mode. However, in an alternative embodiment, polls of or jumps to and from process M may occur at any time in the course of lock contention procedure.

If processor 1a determines that the present lock mode is not associated with process M at step 112, or if no protocol failure is indicated by process M in step 113, processor 1a will continue checking for timeouts at step 116. So long as processor 1a does not obtain the lock and no lock override is initiated as described below in connection with FIG. 6 or FIG. 8, processor 1a repeats the applicable steps in the lock polling sequence, 116 through 120, and the subsequent sanity check sequence 122 through 129 (with steps 112, 113, and 114 if the lock mode so requires), until it determines either that LOCK_PW, 35, has an invalid value or that MY_NUMBER, 51a, equals CURRENT_HOLDER, 37, either of which cause it to take the lock and make a good exit to process A, as described in steps 106 and 131, or it determines that a timeout or other event requiring a lock override has occurred. Various procedures for handling lock overrides are discussed in connection with FIGS. 6, 7 and 8.

Figure 6:
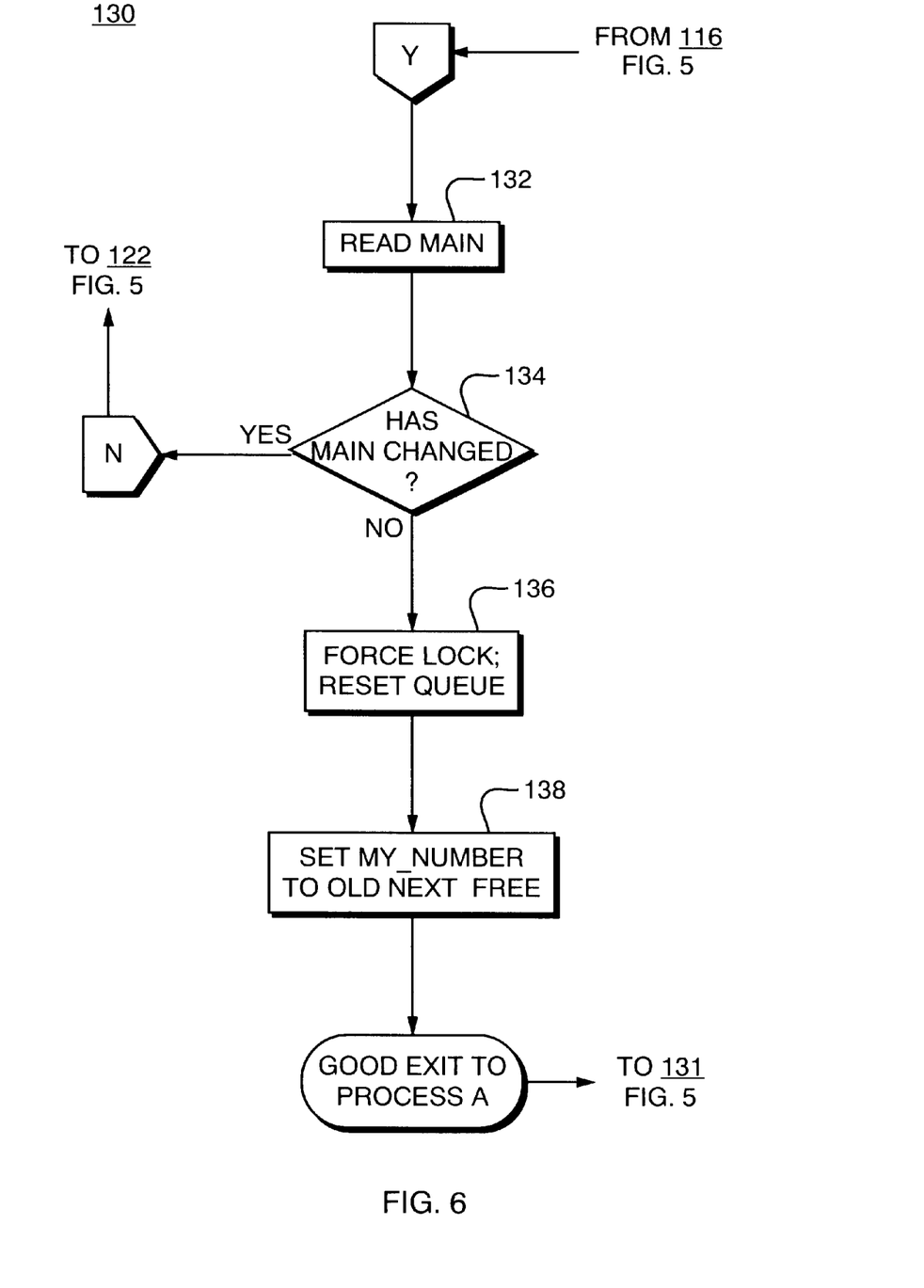
FIG. 6 is a flowchart illustrating steps used to perform a timeout lock override procedure associated with a selected one of the lock modes implemented in the system described herein.

FIG. 6 is a flowchart illustrating steps used to perform a lock override procedure associated with a selected one of the lock modes in the system described herein. This lock override procedure is a timeout procedure. Different timeout procedures with different reference values and timeout intervals may be associated with different lock modes. In the exemplary embodiment, for example, a normal, i.e. short, timeout interval using a first reference value is associated with the default "0" lock mode and a long timeout interval using a second reference value is associated with the other "T" lock mode Referring now to step 116 in FIG. 5, processor 1a tests to see if a timeout has occurred by determining whether a predetermined interval has elapsed since the reference value for the timeout. If a timeout has occurred, processor 1a enters the lock forcing process of step 130. Going now to FIG. 6, where the process of 130 is illustrated in more detail, if processor 1a determines that a timeout has occurred, then, entering the lock forcing process at Y upon setting a hardware lock, then, in a single atomic read-modify-write operation, represented on the flowchart by steps 132, 134, and 136, processor 1a initiates its attempt to obtain the lock. At step 132, processor 1a will read MAIN, 30, and at step 134 will determine whether MAIN, 30, has changed since processor 1a last read MAIN and stored its value in local memory. If it has not, at step 136, processor 1a will force the lock, and reset the entire lock request queue, by setting CURRENT_HOLDER, 37, equal to value of NEXT_FREE, 39, it read in step 132, incrementing NEXT_FREE, setting the LOCK_MODE, 33, to the default mode indicator (regardless of which lock mode processor 1a actually requires), setting HOLDER_ID, 31, to its own identifier and setting the LOCK_PW, 35, to a valid password. Steps 132, 134, and 136 must be performed as an atomic operation. At step 138, processor 1a will complete the lock override procedure by setting MY_NUMBER, 51a, equal to the value of NEXT_FREE, 39, it read in step 132. Processor 1a will then make a good exit to process A. As discussed in connection with step 131 in FIG. 5, should processor 1a require the lock in some mode other than the default mode, it will, as a part of this process, proceed as described in connection with FIG. 7. Otherwise, it will simply take the lock and exit the lock contention procedure.

If more than one processor is in the lock request queue when the first mode timeout occurs, it is possible that more than one processor will detect the event and attempt to force the lock. It would be undesirable for more than one processor to do so successfully. So, if processor 1a detects in step 134 that MAIN, 30, has changed since the last time processor 1a polled MAIN, it will release its hardware lock at Z and exit the forcing procedure. It will then continue with the sanity check sequence described in connection with FIG. 5, beginning with step 122, if implemented, using the new value of MAIN which it read at step 132, and proceeding to steps 124 and beyond. Typically, in this scenario, processor 1a will detect in step 126 that the lock request queue has been reset, and will then repeat steps 100, 102, 104, and 108 in order to join the new lock queue. If processor 1a has not detected the timeout before the lock is forced, and so never enters the lock forcing process, then when processor 1a reaches step 126 in its regular polling sequence, it will detect that MY_NUMBER, 51a, is no longer in the queue and will also repeat steps 100, 102, 104, and 108 in order to join the new lock queue.

Figure 7:
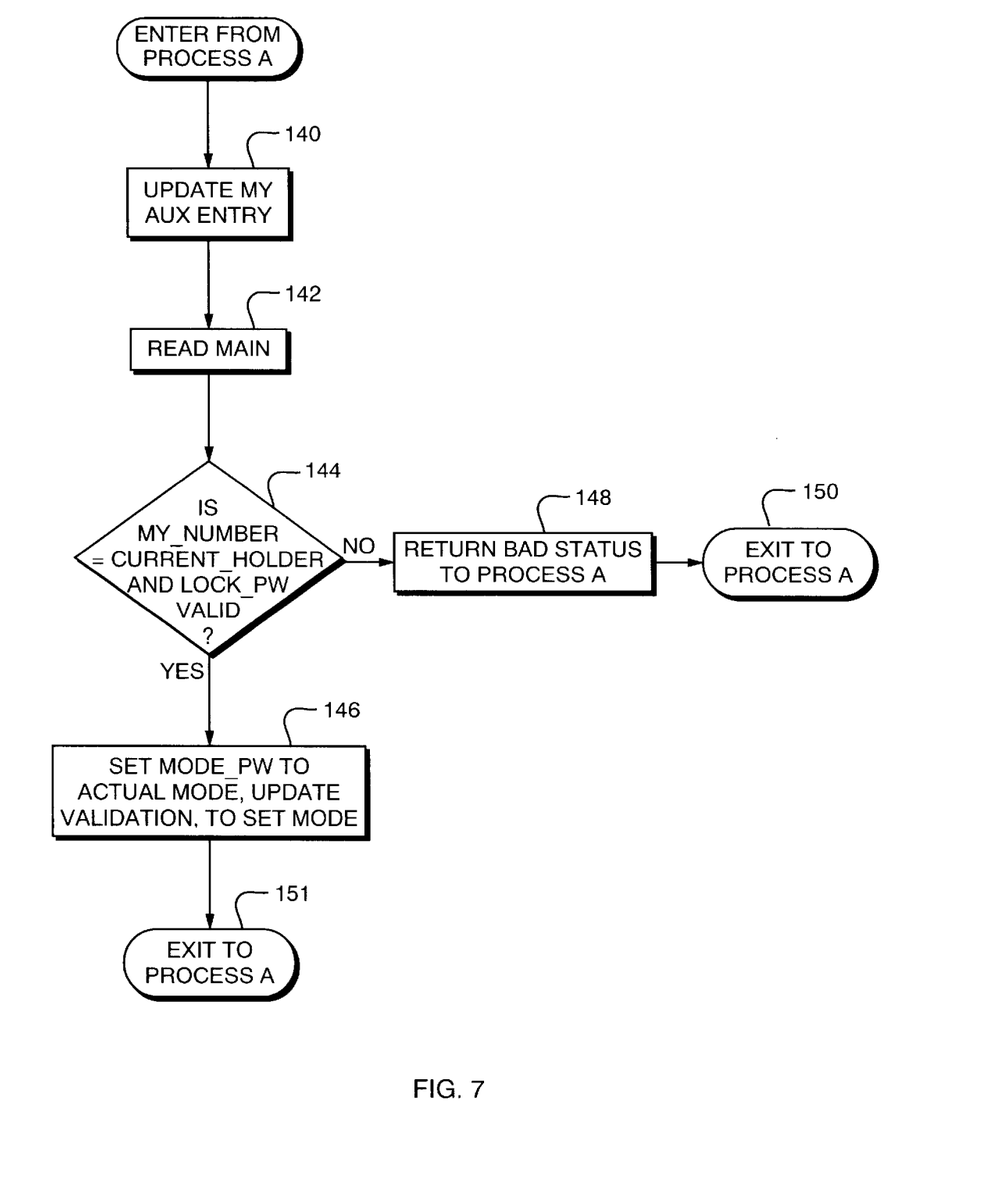
FIG. 7 is a flowchart illustrating steps used to take the lock, to select one of the lock modes, to perform a supplemental validation associated with the selected lock mode, and to initialize a cooperative lock override procedure associated with the selected lock mode implemented in the system described herein.
Figure 8:
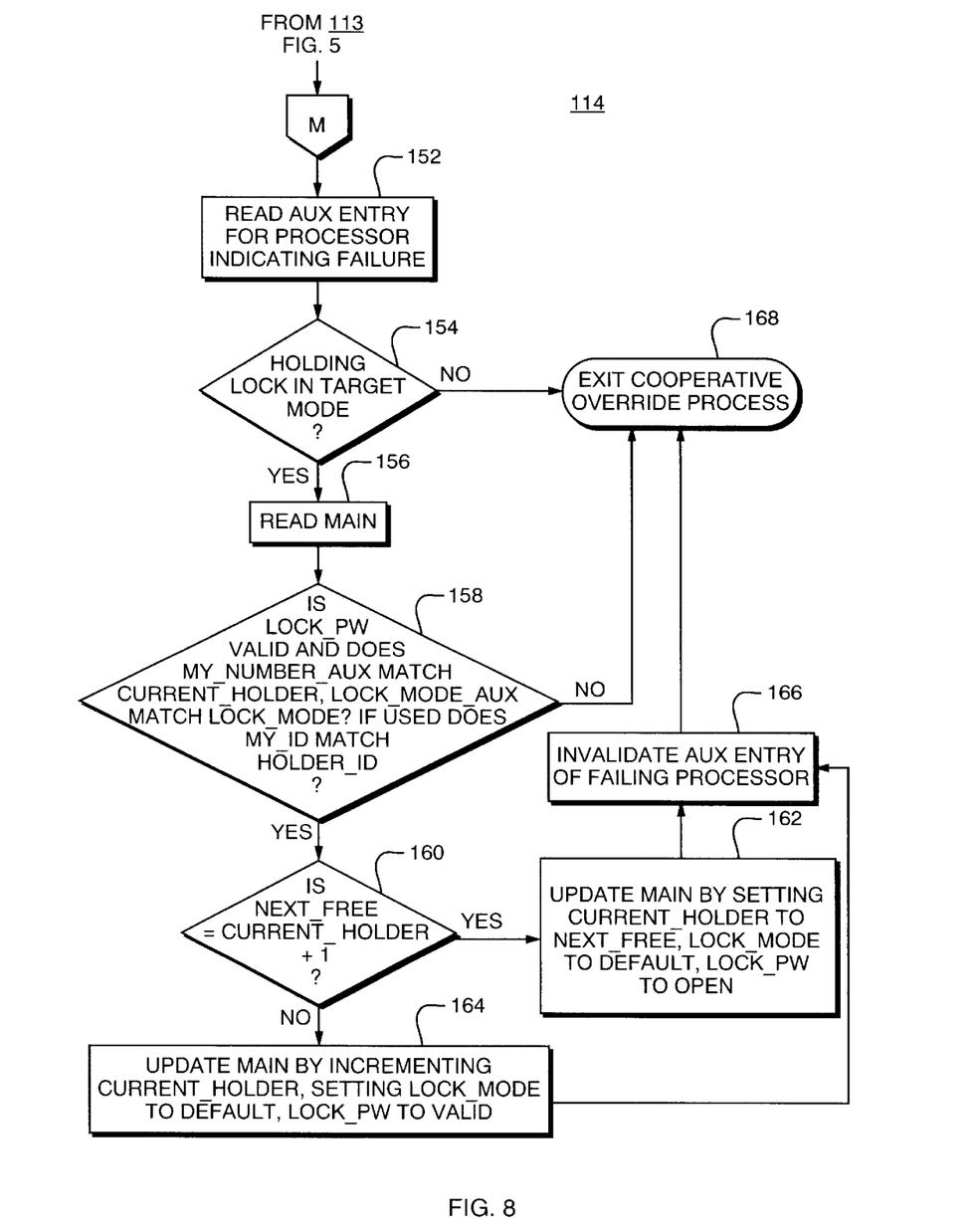
FIG. 8 is a flowchart illustrating steps used to perform the cooperative lock override procedure corresponding to a selected one of the lock modes in the system described herein.

FIG. 7 is a flowchart illustrating steps used to select a lock mode (in this case, the second lock mode) other than the default lock mode, to perform a supplemental validation associated with the selected lock mode, and to initialize a second lock override procedure associated with the selected lock mode. FIG. 8 will describe how the second lock override procedure is performed. The second lock override procedure is a cooperative lock override procedure, and, for purposes of illustration, will be associated with the second, or long timeout lock mode. Because it involves a number of steps using scarce system resources, the cooperative lock override procedure is most suitably associated with a lock mode expected to consume many more I/O cycles or system resources than the default lock mode. To minimize the likelihood of tying up these system resources in error, a supplemental validation procedure is selectively associated with this lock mode. For purposes of this discussion and the one that follows in connection with FIG. 9, it will be assumed that processor 1a has queued for the lock and determined in step 124 of FIG. 5 that its MY_NUMBER, 51a, corresponds to CURRENT_HOLDER, 37. Processor 1a has therefore made a good exit to process A at step 131. It will also be assumed that processor 1f is next in the lock request queue.

Turning now to FIG. 7, where the supplemental validation process is described in more detail, processor 1a calls the supplemental validation process from process A, as discussed in connection with step 131 of FIG. 5, because it needs an alternate mode for which supplemental validation is associated, in this case the long timeout mode. In step 140, processor 1a updates AUX, 40 by setting LOCK_MODE_AUX, 43, to the identifier of the lock mode it requires, in this case the identifier, "T", for long timeout mode, and MY_NUMBER_AUX, 45, to MY_NUMBER, 51a, the number of its place in the queue. If AUX is an array, processor 1a will update only the values in its own entry AUX(a). It should be noted that TIME_STAMP_AUX, 47, and MY_ID, 41, are not required parameters in connection with the second lock override procedure illustrated in FIG. 7, although either or both may optionally be used for validation in connection with this procedure. If a timeout is associated with the selected lock mode, or if TIME_STAMP_AUX, 47, is to be used for validation, processor 1a will also update TIME_STAMP_AUX, 47, to the time at which step 140 occurs, and if MY_ID, 41, is implemented in AUX, will update MY_ID to the value of its unique identifier. It is not necessary to implement a timeout in addition to the cooperative lock override procedure described below in connection with any selected mode, but depending on the events used to trigger the cooperative lock override procedure, it may be desirable to do so. In the illustrative embodiment, as will be discussed in connection with FIG. 8, both an event-based cooperative lock override procedure and a timeout-based lock override procedure are associated with the long timeout mode. Typically, if both are implemented, processor 1a reads an internal clock, preferably the system clock, to determine the time at which step 140 occurred and puts this value in TIME_STAMP_AUX, 47. In an atomic read-modify-write operation shown as steps 142, 144, and 146, processor 1a then reads MAIN, 30, at step 142 and determines at step 144 whether it validly holds the lock by determining whether MY_NUMBER, 51a, is equal to CURRENT_HOLDER and the LOCK_PW, 35, has a valid value. Since processor 1a has just taken the lock, in the absence of a memory corruption involving MAIN, 30, or other protocol error, this operation is expected confirm its custody of the lock. Upon receiving confirmation that it still holds the lock and still as part of the atomic operation begun in step 142, processor 1a updates MAIN, 30, in step 146 by setting LOCK_MODE, 33, to the mode indicator "T", and updating the validation parameters implemented in MAIN. Processor 1a then exits the supplemental validation process at 151 and proceeds with process A. If any confirmation step in the sequence fails to confirm that processor 1a holds the lock, then processor 1a gives a "bad status" error message to process A at step 148 and exits the lock contention process to process A at step 150, relinquishing any hardware locks as it does so. Although each confirmation requires an extra bus cycle, any failure to confirm is strong evidence of a protocol violation involving processor holding the lock or the lock itself. Once a resource is locked into a long timeout mode (or another high I/O demand mode) in error, detecting and correcting the problem typically requires a great many bus cycles to correct. The validation steps significantly decrease the likelihood of such errors.

The processes indicated at steps 113 and 114 of FIG. 5 will now be described in more detail. Turning now to FIG. 8, the second lock override procedure is initiated at M when any processor detects certain types of protocol failures while the processor which hold the lock is operating in a lock mode associated with the second lock override procedure, by way of example, the long timeout mode. The detecting processor need not be a current member of the lock request queue, and may, in some instances, even be the one which holds the lock. In one aspect, the second lock override procedure may be initiated when a processor receives a predetermined indication from a process M external to the lock services procedure that another processor is malfunctioning. For example, in the SYMMETRIX® storage systems manufactured by EMC Corporation, the processors monitor certain of their own functions. If a processor detects certain types of malfunctions, it will put a message in a first predetermined area in global memory indicating that it is malfunctioning. All processors periodically poll this area for indications of malfunctions in the other processors. In addition, each processor periodically sends a signal, called a heartbeat, over the common bus to a predetermined area in global memory to indicate that it is in good working order, and all processors monitor the heartbeats of all other processors by polling for these heartbeats. If the polling processor fails to detect the heartbeat of another processor for a predetermined interval, the polling processor determines that the silent processor has malfunctioned. A processor may even trigger this override on itself as lockholder if it receives an indication, for example, from process A, that it may have failed to clear the lock in a previous operation. Other events can also be used to trigger the cooperative override procedure. At step 113 in FIG. 5, processor 1c detects a malfunction in processor 1a via process M and enters the cooperative override process shown at step 114 in FIG. 5. At step 152, processor 1c reads AUX, 40, or, if AUX is an array, AUX(a) corresponding to processor 1a. At step 154, processor 1c determines whether processor 1a had set its LOCK_MODE_AUX entry, 43, to indicate a mode associated with the cooperative lock override procedure, in our example, the long timeout mode. The value of MY_NUMBER_AUX, 45, in AUX, 40, indicates what place in the queue a processor held the last time it updated AUX. However, since each processor updates its entry in AUX only when it requires a long timeout mode and corruption of the data in the interim periods is possible, it is desirable to validate AUX, 40, using either the time in TIME_STAMP_AUX, 47, or the processor identifier in MY_ID, 41, or both. If the entry is corrupt, it is unlikely that MY_ID will contain the proper identifier and if the entry is outdated, the time in TIME_STAMP_AUX(a) will so indicate. Since each AUX entry is atomic, all of the reads necessary for validation require only one bus I/O cycle. If AUX is not validated or does include the indicator for the long timeout mode, the second lock override procedure will not be implemented, and processor 1c will exit the sequence at 168. If AUX indicates that processor 1a held the lock in long timeout mode, and the requisite validation criteria are satisfied, then at step 156, processor 1c reads MAIN, 30, and at step 158 attempts to validate that processor 1a held the lock in long timeout mode. If MAIN, 30 is not validated or does include the requisite indicators for the long timeout mode, the second lock override procedure will not be implemented, and, as before, processor 1c will exit the sequence at 168. If processor 1c is not queued for the lock, at 168 it will exit the lock contention procedure, but if processor 1c is a member of the lock request queue, from 168 it will continue the lock polling sequence at step 116 in FIG. 5.

If at step 158, processor 1c does validate that processor 1a held the lock in long timeout mode by finding that CURRENT_HOLDER, 37, has the same value as the value of MY_NUMBER_AUX, 45, which processor 1a read in step 152, that LOCK_MODE, 33, is set to indicate the long timeout mode, and that LOCK_PW, 35, and HOLDER_ID, 31, if implemented, validate that processor 1a holds the lock, then at step 160, processor 1c determines whether the value of NEXT_FREE, 39, read at step 156 is equal to CURRENT_HOLDER, 37, plus 1. If it is, there is no other requestor in the queue, so at step 162, processor 1c updates MAIN to indicate the lock is not held by setting CURRENT_HOLDER, 37, equal to the value of NEXT_FREE, 39, setting the LOCK_MODE, 33, to its default value and setting the LOCK_PW, 35, to indicate "no lock holder". If NEXT_FREE, 39, is not equal to CURRENT_HOLDER, 37, plus 1, there are other requestors in the lock queue, so at step 164, processor 1c updates MAIN, 30, by incrementing CURRENT_HOLDER, 37, setting LOCK_MODE, 33 to its default value and setting the LOCK_PW, 35, to any valid value. Following step 162 or 164, at step 166, processor 1c invalidates AUX, 40, by writing over at least MY_ID, 41, and preferably the entire entry, and then exits the cooperative lock override procedure at step 168, as described above. Meanwhile, the processors in the lock request queue will continue with the lock polling sequence described in connection with FIG. 5. Processor 1f, the lock requestor which has been moved to the head of the queue by processor 1c will detect on its next poll that the LOCK_PW, 35, is valid and that MY_NUMBER, 51c, is now equal to CURRENT_HOLDER, 37, and will accept the lock.

Figure 9:
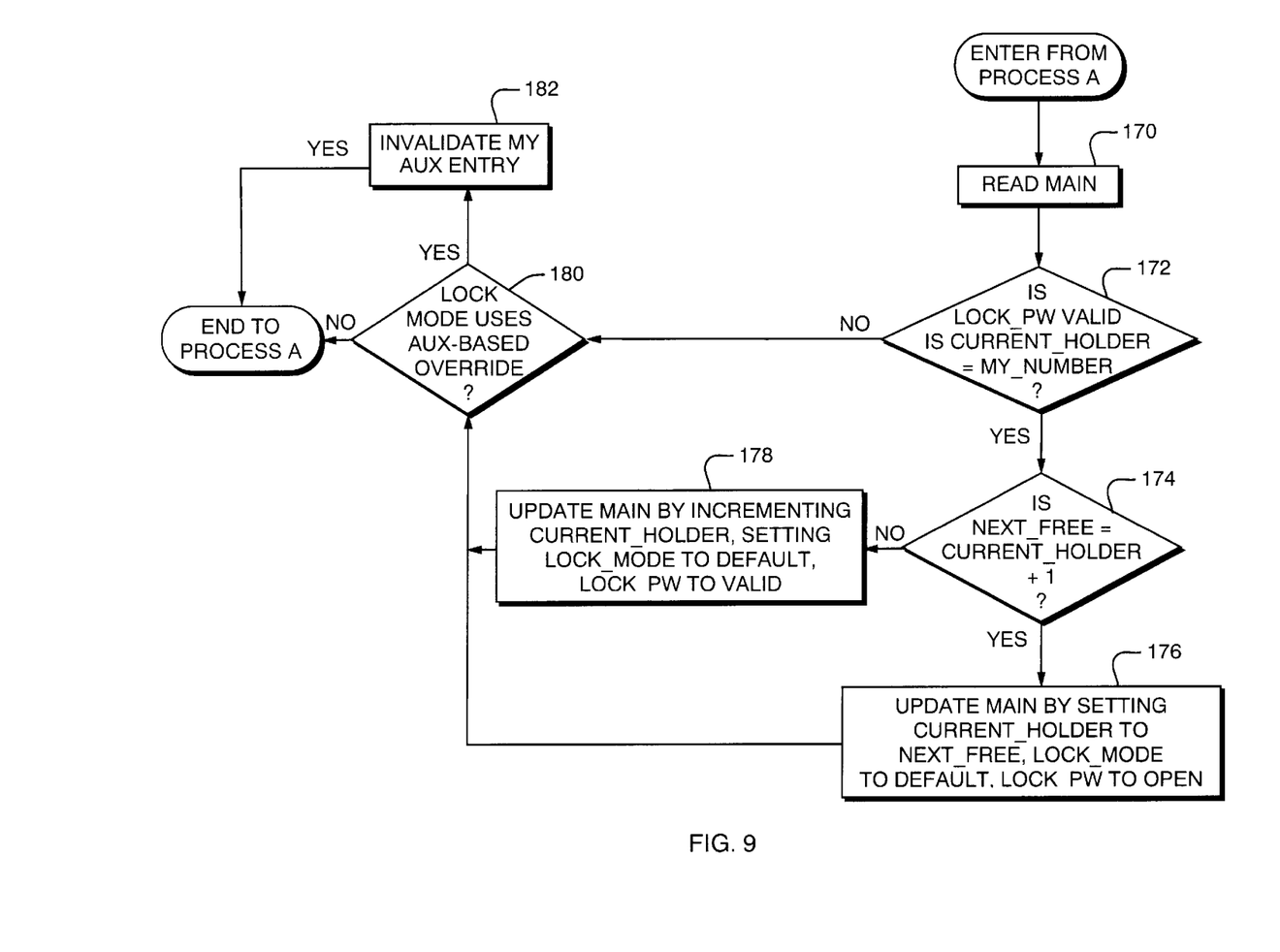
FIG. 9 is a flowchart illustrating steps used to unlock the lock during normal operation of the system described herein.

Turning now to FIG. 9, the procedure for unlocking the lock in the absence of a protocol error is shown. As indicated above in connection with FIG. 8, it will be assumed that processor 1a holds the lock in long timeout mode and processor 1f is the next requestor in the queue. Except where indicated, the steps are the same regardless of whether processor 1a held the lock in default mode or in another mode. It will also be assumed that processor 1a has successfully completed the portion of process A which required a lock on the shared resource 4 and still retains the lock, i.e. that no other processor has completed a lock override procedure. At step 170, processor 1a reads MAIN, 30, and at step 172 determines whether MAIN is valid and whether the value of CURRENT_HOLDER, 37, read at step 170 is equal to the value of MY_NUMBER, 51a. If both conditions are satisfied, then at step 174, processor 1a determines whether the value of NEXT_FREE, 39, read at step 170 is equal to CURRENT_HOLDER, 37, plus 1. If it is, there is no other requester in the queue, so at step 176, processor 1a updates MAIN to indicate the lock is not held by setting CURRENT_HOLDER, 37, equal to the value of NEXT_FREE, 39, setting the LOCK_MODE, 33, to its default value and setting the LOCK_PW, 35, to indicate "no lock holder". If NEXT_FREE, 39, is not equal to CURRENT_HOLDER, 37, plus 1, there are other requestors in the lock queue, so at step 178, processor 1a updates MAIN, 30, by incrementing CURRENT_HOLDER, 37, setting LOCK_MODE, 33 to its default value and setting the LOCK_PW, 35, to any valid value. These steps are performed as an atomic read-modify-write operation. Following step 176 or 178, or following step 172 if either of the conditions are not satisfied, processor 1a decides, at step 180 if it held the lock in a lock mode associated with a lock override procedure which requires a reference to AUX, 40, such as the cooperative lock override procedure described in connection with FIG. 8, or a timeout-based procedure which uses TIME_STAMP_AUX, 47, as its reference value. If it did not hold the lock in such a mode, it will exit the lock services procedure, 6a, to resume process A. However, in the exemplary embodiment, processor 1a held the lock in long timeout mode, which is associated with both the cooperative lock override procedure and a timeout procedure which uses TIME_STAMP_AUX, 47, as its reference value, so at step 182, processor 1a invalidates AUX by writing over at least MY_ID, and preferably the entire entry, and then exits the lock services procedure to resume process A. Meanwhile, processor 1f, continuing with the lock contention procedure of FIG. 5, will shortly discover at step 124 that CURRENT_HOLDER, 37, is now equal to MY_NUMBER, 51f, and so, in normal operation, the lock will pass to the next member of the queue.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the following claims.

What is claimed is:

1. A method for providing queued, multimodal, self-validating locking and unlocking services for managing a shared resource in a data processing system including a plurality of processors as lock requesters, each processor supporting atomic operations and being coupled to the shared resource through one or more first common communication channels, including the steps of:

providing for the shared resource, an associated main lock data structure stored in a shared memory accessible by a plurality of processors, the main lock data structure including in a single atomic structure, the resources needed to lock the shared resource by a successful lock requester, to identify one of at least two lock modes, to establish a queue of unsuccessful lock requestors, and to validate the existence of a lock;

providing for each processor a lock services procedure including at leas first and second lock mode procedures, a lock mode selection procedure for selecting one from the lock mode procedures by a successful lock requester, a queuing procedure for unsuccessful lock requesters, locking and unlocking procedures for locking and unlocking the shared resource in the selected lock mode by a successful lock requestor, and a supplemental validation procedure selectively associated with the second lock mode for validating the lock by a successful lock requestor;

selecting one from the lock modes by a requesting processor;

in a single atomic operation by the requesting processor, examining the contents of the main lock data structure to determine if another requesting processor has previously locked the shared resource and if the lock contents are valid, and writing data to the main lock data structure to establish its place in a queue of requesters for subsequent locks on the shared resource if some other requesting processor has previously locked the shared resource and the lock contents are also valid, or writing data to the main lock data structure to reserve and validate the lock and to identify the first lock mode if the lock contents are invalid or if no other requesting processor has previously locked the shared resource; and then, if the lock contents are invalid or if no other requesting processor has previously locked the shared resource and the second lock mode has been selected by the requesting processor, executing the supplemental validation procedure by the requesting processor to validate the lock allocation to that requesting processor and, if the supplemental validation procedure does validate the lock allocation to that requesting processor, then, writing data to the main lock data structure to identify the second lock mode.

2. An intelligent data storage system comprising:

a shared resource;

a plurality of processors as lock requestors, each processor supporting atomic operations and being coupled to the shared resource through one or more first common communication channels;

a shared memory accessible over one or more second common communications channels to all of the processors;

a lock services procedure implemented in each of the processors, the lock services procedure including at least first and second lock mode procedures, a lock mode selection procedure for selecting one from the lock mode procedures by a successful lock requester, a queuing procedure for unsuccessful lock requestors, locking and unlocking procedures for locking and unlocking the shared resource in the selected lock mode by a successful lock requester, and a supplemental validation procedure selectively associated with the second lock mode for validating the lock by a successful lock requester;

an atomic main lock data structure, responsive to the lock services procedure, implemented in the shared memory and associated with the shared resource, which includes the resources needed to lock the shared resource by a successful lock requestor, to identify one of the lock modes, to establish a queue of unsuccessful lock requesters, and to validate the existence of the lock;

each requesting processor being operable in accordance with its lock services procedure:

to select from one of the lock modes, in a single atomic operation, to examine the contents of the main lock data structure to determine if another requesting processor has previously locked the shared resource and if the lock contents are valid, and to write data to the main lock data structure to establish its place in a queue of requestors for subsequent locks on the shared resource if some other requesting processor has previously locked the shared resource and the lock contents are also valid, or to write data to the main lock data structure to reserve and validate the lock and to identify the first lock mode if the lock contents are invalid or if no other requesting processor has previously locked the shared resource; and then, if the lock contents are invalid or no other requesting processor has previously locked the shared resource and the second lock mode has been selected by the requesting processor, executing the supplemental validation procedure by the requesting processor to validate the lock allocation to that requesting processor and, if the supplemental validation procedure does validate the lock allocation to that requesting processor, then, writing data to the main lock data structure to identify the second lock mode.

* * * * *